United States Patent
Yano

(10) Patent No.: US 6,199,840 B1
(45) Date of Patent: Mar. 13, 2001

(54) FLUID-FILLED VIBRATION-ISOLATOR

(75) Inventor: Katsuhisa Yano, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/189,840

(22) Filed: Nov. 12, 1998

(30) Foreign Application Priority Data

Nov. 20, 1997 (JP) ..................................................... 9-319446

(51) Int. Cl.⁷ ..................................................... F16F 13/00
(52) U.S. Cl. ..................................................... 267/140.12
(58) Field of Search ........................... 267/140.11, 140.12, 267/219, 220

(56) References Cited

U.S. PATENT DOCUMENTS

| | | |
|---|---|---|
| 4,588,174 | 5/1986 | Konishi . |
| 5,050,850 * | 9/1991 | Noguchi et al. ................. 267/140.12 |
| 5,060,918 | 10/1991 | Kanda . |

FOREIGN PATENT DOCUMENTS

| | | | |
|---|---|---|---|
| 4233705 * | 4/1994 | (DE) | ................................. 267/140.12 |
| 62-118133 * | 5/1987 | (JP) | ................................. 267/140.12 |
| 2-30932 * | 12/1990 | (JP) | ................................. 267/140.12 |

OTHER PUBLICATIONS

Patent Abstracts of Japan, vol. 10, No. 155, Jun. 4, 1986, JP 61–10138, Jan. 17, 1986.

* cited by examiner

Primary Examiner—Matthew C. Graham
(74) Attorney, Agent, or Firm—Oblon, Spivak, McClelland, Maier & Neustadt, P.C.

(57) ABSTRACT

A fluid-filled vibration-isolator includes a main axis fitting, an outer cylinder-shaped fitting disposed at the outside of the main axis fitting, a rubber elastic member, a stopper fitting disposed at the circumferential surface of the main axis fitting, and a fluid contained in fluid chambers. The rubber elastic member has a pair of ring-shaped side walls, a pair of partition walls, and an orifice passage disposed in at least one of the partition walls. The rubber elastic member has a spacer filling a gap between the axial end surface of the stopper fitting and the ring-shaped side wall facing each other. The axial end surface of the stopper fitting is free from the fluid chamber not to face the fluid chamber.

8 Claims, 3 Drawing Sheets

FLUID-FILLED VIBRATION-ISOLATOR

BACKGROUND OF THE INVENTION

1. Field of the Invention

The present invention relates to a hydraulic vibration-isolator which is applicable, for instance, to hydraulic suspension-bushings used as a vibration-insulating member for suspension mechanisms installed onto vehicles.

2. Description of the Related Art

In a suspension mechanism installed onto a vehicle, there has been provided a hydraulic vibration-isolator for decreasing vibrations resulting from a road surface or a vehicle tire. The hydraulic vibration-isolator is installed, for instance, at an L letter-shaped lower arm of a FR suspension mechanism in such a manner that an axial direction of the hydraulic vibration-isolator corresponds to a length direction of the vehicle. In this case, as for the hydraulic vibration-isolator, a main axis fitting thereof is fixed to the lower arm, an outer cylinder-shaped fitting is fixed to a supporting member of the vehicle body, partition walls thereof are disposed in a vertical direction of the vehicle, and a pair of divided fluid chambers thereof is disposed in a width direction of the vehicle. When vibrations are inputted between the main axis fitting and the outer cylinder-shaped fitting, the vibrations can effectively be damped on the basis of an elastic function of a rubber elastic member and on the basis of a fluid-column-resonating action caused by a fluid which flows in the fluid chamber owing to the elastic function of the rubber elastic member.

In such a way, the hydraulic vibration-isolator, utilizing fluid-column-resonating action caused by the fluid flowing in the fluid chamber, is constituted to decrease load noises, vertical vibrations transmitted from the road surface and the vehicle tire.

Recently, decrease of load noises is further requested. So, as ways for achieving this request, it is thought that a rubber material having a low spring property and a static spring constant in a vertical direction is desired.

Such materials, however, decrease a frequency region of fluid-column-resonating action utilizing the inner stopper to lower regions. When a frequency region of the fluid-column-resonating action decreases to a practical frequency region, i.e. a frequency region of less than 500 Hz, it is possible to use a fluid-column-resonating action for isolating vibrations. However, the fluid-column-resonating action surely exerts anti-resonance which effects a bad influence in decreasing the load noises.

SUMMARY OF THE INVENTION

The present invention has been developed in view of the aforementioned situations associated with the conventional hydraulic vibration-isolator.

It is therefore an object of the present invention to provide an hydraulic vibration-isolator which can effectively decrease load noises.

The present inventor has known the phenomenon that an influence of anti-resonance is hardly generated in the hydraulic vibration-isolator when a frequency region of fluid-column-resonating action is increased to a higher frequency region which does not impede a practical function in the hydraulic vibration-isolator. In other words, the present inventor has known that it is desirable to increase a frequency region of the fluid-column-resonating action to a higher frequency region to flow the fluid easily in the fluid chamber of the hydraulic vibration-isolator.

FIGS. 5 and 6 show a conventional hydraulic vibration-isolator including: a main axis fitting 100; an outer cylinder-shaped fitting 200; a rubber elastic member 300 having a pair of ring-shaped side walls 301, a pair of partition walls 302, and orifice passages 303; stopper fittings 400; and fluid chambers 500. As shown in FIG. 6, the stopper fitting 400 projects into the fluid chamber 500, facing each of axial end surfaces 400$x$ of the stopper fittings 400 to a gap 500$x$ of the fluid chamber 500, and impedes fluid flow through the fluid chamber 500. So, it is possible to achieve the aforementioned object of the present invention to restrict the stopper fitting 400 at both of the axial end surfaces 400$x$ thereof. Namely, a spacer is formed from the rubber elastic member at the axial end surface of the stopper fitting, which is used in increasing a frequency region of the fluid-column-resonating action to a higher frequency region in the hydraulic vibration-isolator.

According to the present invention, a hydraulic vibration-isolator comprises:

a main axis fitting having an outer circumferential surface, axially opposite ends, and an axially middle portion;

an outer cylinder-shaped fitting disposed at the outside of the main axis fitting away from it;

a rubber elastic member having a pair of ring-shaped side walls connecting the main axis fitting integrally with the outer cylinder-shaped fitting at the axially opposite ends of the main axis fitting, a pair of partition walls extending axially, and an orifice passage disposed in at least one of the partition walls, the ring-shaped side walls constituting an inner room at the axially middle portion of the main axis fitting by encircling it with the ring-shaped side walls, the partition walls dividing the inner room into two fluid chambers in a circumferential direction;

a stopper fitting disposed at the outer circumferential surface of the main axis fitting, projecting towards the fluid chamber, and having axial end surfaces;

a fluid contained in the fluid chambers; and the improvement comprising:

the rubber elastic member having a whole spacer filling a gap between each of the axial end surface of the stopper fitting and each of the ring-shaped side walls facing each other; and each of the axial end surfaces of the stopper fitting being unsurrounded by the fluid chamber.

According to the present invention, the hydraulic vibration-isolator can increase a frequency region of fluid-column-resonating action to a higher frequency region which hardly impede a practical function in the hydraulic vibration-isolator. As a result, as for vibration-isolating ability, the hydraulic vibration-isolator hardly has a bad influence caused by anti-resonance generated near a frequency region of the fluid-column-resonating action.

According to a preferable mode of the present invention, a hydraulic vibration-isolator is characterized in that it comprises a main axis fitting, an outer cylinder-shaped fitting, a rubber elastic member having a pair of partition walls and an orifice passage, a stopper fitting, and a fluid contained in fluid chambers; wherein the rubber elastic member has a spacer filling entirely a gap between an axial end surface of the stopper fitting and a ring-shaped side wall facing each other, and the axial end surface of the stopper fitting is free from the fluid chamber not to face the fluid chamber.

According to the preferable mode of the present invention, the main axis fitting is provided with a pair of stopper fittings disposed symmetrically with respect to its axis and projecting outwardly in a radius direction. The stopper fitting restricts a relative displacement between the main axis fitting and the outer cylinder-shaped fitting, and it can be formed of metal like the main axis fitting. The fluid, such as alkylane-glycol or silicone oil, having an incompressible property, is contained in the inner room, i.e. the fluid chamber, formed in the rubber elastic member.

The partition wall may be formed at a circumferential phase shifted an angle of approximately 90 degree away from the stopper fitting. The partition walls of the rubber elastic member preferably has a thin portion extending axially. The spacer formed with the rubber elastic member is to suppress a fluid-resistance which is received by the axial surface of the stopper fitting. Namely, in the conventional case where the stopper fitting projects into the fluid chamber to face its axial end surface to the fluid chamber, the stopper fitting raises fluid-resistance when the contained fluid flows in the fluid chamber.

In a preferable mode, the hydraulic vibration-isolator has a formula of K1:K2=1: (0.5–2.0). K1 exhibits a static spring constant in a direction joining both of the fluid chambers, and K2 exhibits a static spring constant in a direction joining both of the partition walls. If a ratio is less than K1:K2=1:0.5, there is a problem in that a frequency region of the fluid-column-resonating action is decreased to a lower frequency region and that anti-resonance effects a bad influence. If a ratio is more than K1:K2=1:2.0, there is a problem in vibration-suppressing ability.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which form a part of the disclosure.

DETAILED DESCRIPTION OF THE PREFERRED EMBODIMENT

Having generally described the present invention, a further understanding can be obtained by reference to the specific preferred embodiments which are provided herein for the purpose of illustration only and which are not intended to limit the scope of the appended claims.

Figure 1:
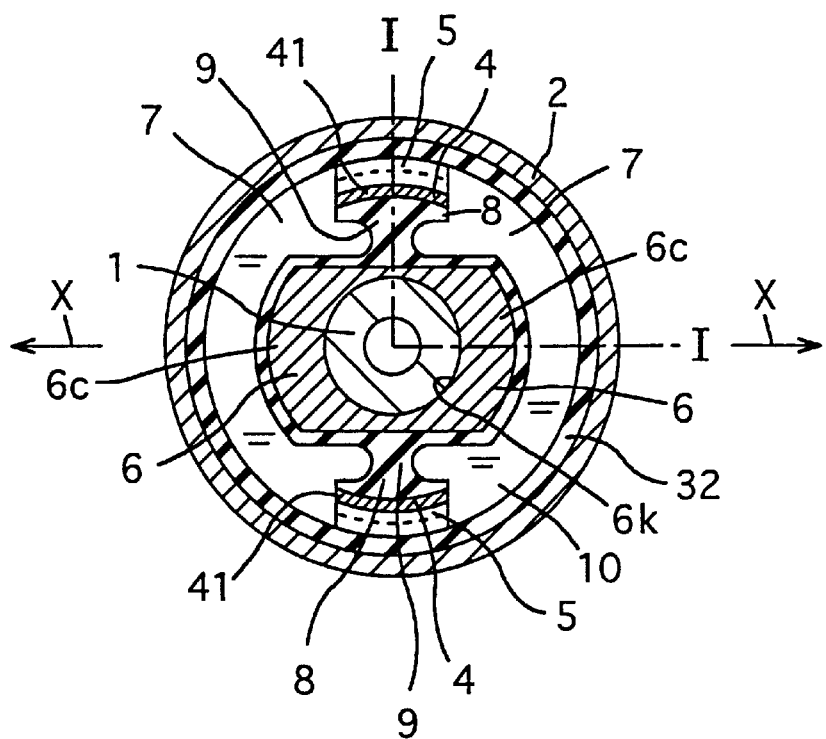
FIG. 1 is a cross-sectional view of a hydraulic vibration-isolator according to a preferred embodiment of the present invention.
Figure 2:
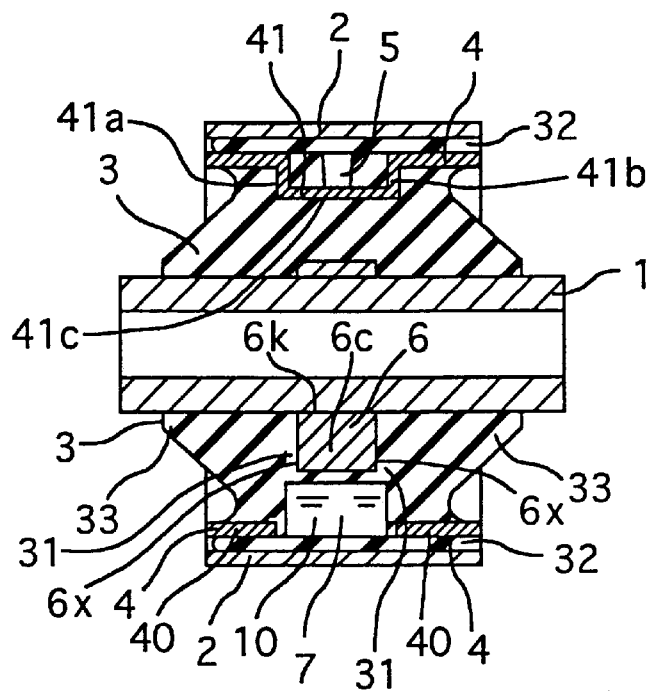
FIG. 2 is a cross-sectional view taken along an I—I line of FIG. 1.
Figure 6:
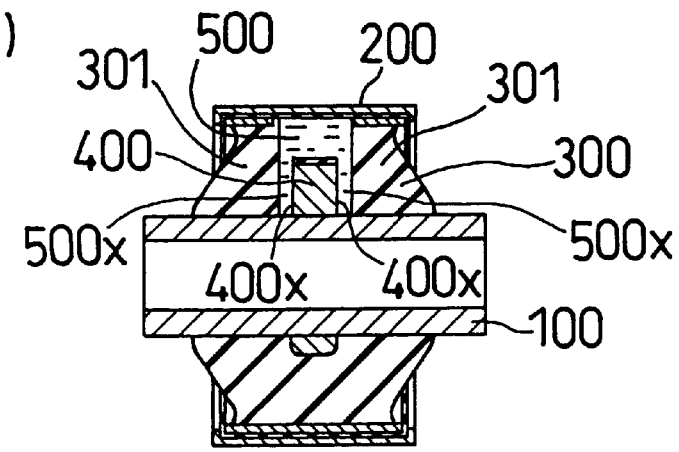
FIG. 6 is a cross-sectional view taken along a VI—VI line of FIG. 5.

As shown in FIGS. 1 and 2, a hydraulic vibration-isolator i.e., a hydraulic suspension-bushing, of the preferred embodiment according to the present invention includes (1) a main axis fitting 1; (2) an outer cylinder-shaped fitting 2; (3) a middle cylinder-shaped fitting 4 disposed coaxially at the outside of the main axis fitting 1 away therefrom; (4) a rubber elastic member 3 integrally connecting both of the main axis fitting 1 and the middle cylinder-shaped fitting 4; (5) a pair of fluid chambers 7 formed at the axially middle portion of the main axis fitting 1 and disposed at both sides of the main axis fitting 1 in a radius direction; (6) a pair of partition walls 8 extending axially and putting the main axis fitting 1 therebetween; (7) orifice passages 5 arranged at a connecting portion between the partition walls 8 and the outer cylinder-shaped fitting 2; (8) a pair of stopper fittings 6 disposed at the circumferential surface of the main axis fitting 1 and having a projecting portion 6c disposed at a circumferential phase angle of 90 degree away from the partition walls 8; (9) a pair of spacers 31 filling a gap between the axial end surfaces 6x of the stopper fittings 6 and the ring-shaped side walls 33 facing each other; and (10) a fluid 10 contained in the fluid chambers 7. The axial end surfaces 6x of the stopper fittings 6 are disposed not to face the fluid chamber 7, as distinct from FIG. 6 wherein the fluid chamber 500 surrounds the stopper fitting 400.

The main axis fitting 1 is formed of metal to have a pipe shape. The outer cylinder-shaped fitting 2 is formed of metal to have a pipe shape penetrated axially and having an inner hole capable of axially inserting the middle cylinder-shaped fitting 4. A sealed rubber 32 is integrally adhered by vulcanization at the inner circumferential surface of the outer cylinder-shaped fitting 2.

The stopper fitting 6 is formed of metal to have an approximately oval shape in its cross-sectional view taken in a radius direction, as shown in FIG. 1. The projecting portion 6c of the stopper fitting 6 includes an arc surface corresponding to the inner circumferential surface of the outer cylinder-shaped fitting 2, as shown in FIG. 1. The stopper fitting 6 includes a central hole 6k into which the main axis fitting 1 is inserted and fixed. Accordingly, the stopper fittings 6 project outwardly in the radius direction, i.e. as arrows in the X direction, and they are arranged to have a symmetric configuration with respect to the main axis fitting 1. The stopper fittings 6 are to suppress a relative displacement for the main axis fitting 1 to shift in projecting directions of the stopper fittings 6, the radius direction.

The middle cylinder-shaped fitting 4 is integrally formed of metal to include two ring portions 40 disposed at axial ends thereof, and two bridge portions 41 connecting both of the ring portions 40. As shown in FIG. 2, each of the bridge portion 41 projects inwardly in a radius direction, and it has a channel shape including first-portions 41a,41b extending in the radius direction and a second-portion 41c extending in the axial direction. The axial length of the second portion 41c corresponds to the axial length of the fluid chamber 7. The bridge portions 41 is disposed in the partition wall 8.

The rubber elastic member 3 is adhered with the main axis fitting 1 and the middle cylinder-shaped fitting 4 by vulcanization to integrally connect them. The rubber elastic member 3 includes: (1) the pair of ring-shaped side walls 33 adhered with the ring portion 40 of the middle cylinder-shaped fitting 4 at axial ends thereof; (2) spacers 31 filling a gap between the axial end surface 6x of the stopper fitting 6 and the ring-shaped side wall 33 facing each other; (3) and the pair of partition walls 8 adhered with the bridge portion 41 and dividing the inner room between the ring-shaped side walls 33 into two fluid chambers 7.

Each partition wall 8 includes a thin portion 9 extending axially, and the orifice passage 5 formed at the connected portion between the outer cylinder-shaped fitting 2 and the thin portion 9. The thinnest parts of the thin portion 9 is one-fifth (⅕) of the rest of the partition wall 8 in thickness. The thin portion 9 is formed smoothly. The orifice passage 5 is penetrated through the channel portion of the bridge portion 41 of the middle cylinder-shaped fitting 4.

As shown in FIG. 1 illustrating the cross-sectional view taken along a radius direction, each of the fluid chambers 7 is faced with the radial end surface of the projecting portion 6c, the inner circumferential surface of the outer cylinder-shaped fitting 2, and the partition walls 8; so, each of the fluid chambers 7 has an approximately arc-fan shape. As shown in FIG. 2 illustrating the cross sectional view taken along the axial direction, each of the fluid chambers 7 is faced with the stopper fitting 6, the outer cylinder-shaped fitting 2, and the spacer 31; so each of the fluid chambers 7 has an approximately rectangle shape. The fluid chambers 7 contain the fluid 10 which has an incompressible property.

The main axis fitting 1 is disposed in a direction of the vehicle length, the partition walls 8 are disposed in a vertical direction, and the stopper fittings 6 are disposed in a direction of the vehicle width. The installing construction is not limited in the hydraulic vibration-isolator.

The hydraulic vibration-isolator of the present embodiment acquired a formula of K1:K2=1:1.5, wherein K1 exhibits a static spring constant in a direction joining both of the fluid chambers 7, namely the projecting direction of the stopper fittings 6, and wherein K2 exhibits a static spring constant in a direction joining both of the partition walls 8.

In the hydraulic vibration-isolator of the present embodiment, when vibrations are inputted in the projecting direction of the stopper fittings 6 projects, the main axis fitting 1 is relatively shifted to deform partition walls 8. The orifice passage 5 is penetrated through the bridge portion 41 of the middle cylinder-shaped fitting 4 passing in the partition wall 8 in such a manner that the deformation of the partition wall 8 does not close the orifice passage 5. Namely, the orifice passage 5 is protected by the bridge portion 41 of the middle cylinder-shaped fitting 4. Therefore, the orifice passage 5 is hardly influenced by the amplitude of the partition wall 8, and fluid flow through the orifice passage 5 is hardly restricted.

Figure 3:
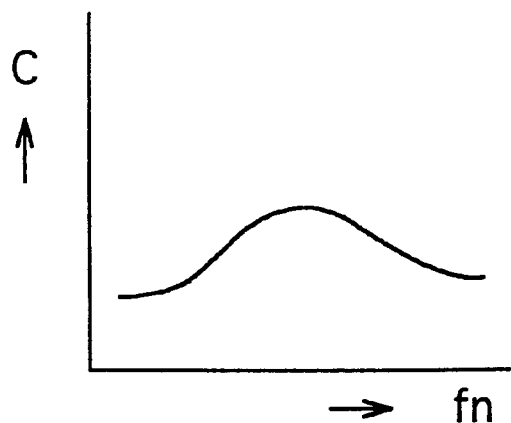
FIG. 3 is a graph showing a vibration-isolating ability in a hydraulic vibration-isolator according to a preferred embodiment of the present invention.
Figure 4:
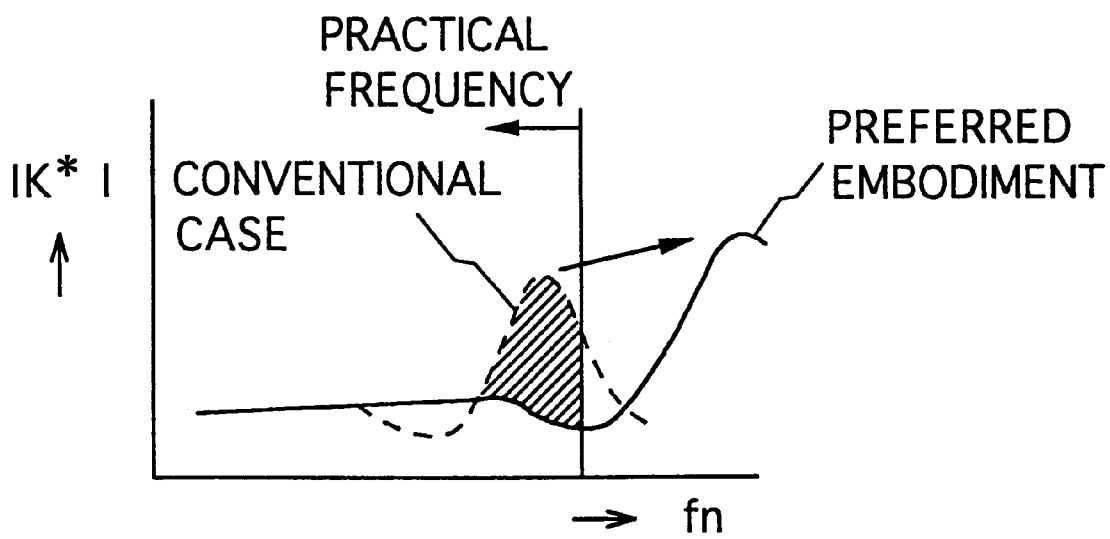
FIG. 4 is a graph showing frequencies of anti-resonance measured in the hydraulic vibration-isolator according to a preferred embodiment of the present invention.
Figure 5:
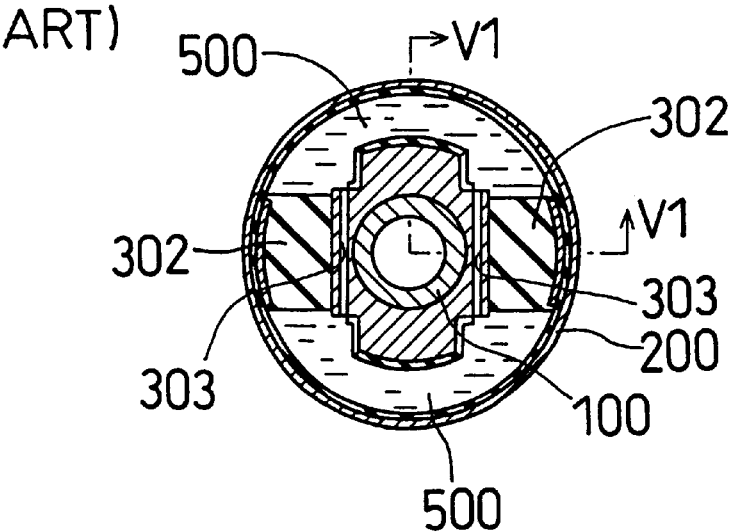
FIG. 5 is a cross-sectional view of a hydraulic vibration-isolator according to a conventional case.

The present embodiment measured vibration-isolating ability on the basis of the fluid-column-resonating action and vibration-isolating ability on the basis of the partition walls 8. FIG. 3 shows the measured results damped by the fluid-column-resonating action. FIG. 4 shows the measured results damped by the partition wall 8. A horizontal axis of FIG. 3 implies a frequency (fn) of the inputted vibration and a vertical axis of FIG. 3 implies an attenuation coefficient. Also, a horizontal axis of FIG. 4 implies a frequency (fn) of the inputted vibration and a vertical axis of FIG. 4 implies an absolute spring constant $|K^*|$.

FIG. 3 shows that, as for an amplitude of the direction of the fluid-column-resonating action, the partition wall 8 has the thin portion 9 to increase deformation-freedom of the main axis fitting 1 and that an amplitude is large.

FIG. 4 shows that frequencies of anti-resonance in the direction of the partition wall 8 are increased to a higher frequency region which hardly impede a practical function of the hydraulic vibration-isolator so the frequencies of anti-resonance exceed a practical frequency which may be for instance 400–600 Hz, 450–550 Hz. Such practical frequency is not limited within the aforementioned regions.

What is claimed is:

1. A hydraulic vibration-isolator, including:
   a main axis fitting having an outer circumferential surface, axially opposite ends, and an axially middle portion;
   an outer cylinder-shaped fitting disposed outside of said main axis fitting;
   a rubber elastic member having a pair of ring-shaped side walls connecting said main axis fitting integrally with said outer cylinder-shaped fitting at said axially opposite ends of said main axis fitting, a pair of partition walls extending axially, and an orifice passage disposed in at least one of the partition walls, said ring-shaped side walls constituting an inner room at said axially middle portion of said main axis fitting by encircling the main axis fitting with said ring-shaped side walls, said partition walls dividing said inner room into two fluid chambers in a circumferential direction;
   a stopper fitting disposed at said outer circumferential surface of said main axis fitting, projecting towards said fluid chambers, and having axial end surfaces; and
   a fluid contained in said fluid chambers;
   wherein the improvement comprises:
   said rubber elastic member having a spacer and filling a gap between each of said axial end surfaces of said stopper fitting and each of said ring-shaped side walls facing each other; and
   each of said fluid chambers being arranged entirely radially outward of the stopper fitting.

2. The hydraulic vibration-isolator according to claim 1, wherein each of said partition walls of said rubber elastic member has a thin portion extending axially.

3. The hydraulic vibration-isolator according to claim 1, wherein said hydraulic vibration-isolator has a formula of K1:K2=1: (0.5–2.0), where K1 exhibits a static spring constant in a direction joining both of said fluid chambers, and K2 exhibits a static spring constant in a direction joining both of said partition walls.

4. The hydraulic vibration-isolator according to claim 1, wherein a middle cylinder-shaped fitting is disposed between said main axis fitting and said outer cylinder-shaped fitting in a radius direction, and said middle cylinder-shaped fitting includes two ring portions disposed at axial ends thereof and a bridge portion connecting both of said ring portions.

5. The hydraulic vibration-isolator according to claim 4, wherein said orifice passage is surrounded with said bridge portion of said middle cylinder-shaped fitting in such a manner that the deformation of said partition wall hardly closes the orifice passage.

6. The hydraulic vibration-isolator according to claim 4, wherein said bridge portion projects inwardly in a radius direction, said bridge portion has an approximately channel shape in a cross-sectional view, and
   wherein said bridge portion includes two first portions extending in the radius direction, and a second portion extending in the axial direction and connecting said two first portions in said cross-sectional view.

7. The hydraulic vibration-isolator according to claim 6, wherein an axial length of said second portion of said bridge portion corresponds to an axial length of said fluid chamber.

8. The hydraulic vibration-isolator according to claim 1, wherein said hydraulic vibration-isolator is used as a suspension bushing installed onto a vehicle body.

* * * * *